Sept. 6, 1938.  A. HOWARD  2,129,529
ELASTIC FLUID TURBINE TURNING MECHANISM
Filed Feb. 17, 1938

Inventor:
Alan Howard,
by Harry E. Dunham
His Attorney.

Patented Sept. 6, 1938

2,129,529

UNITED STATES PATENT OFFICE 2,129,529

ELASTIC FLUID TURBINE TURNING MECHANISM

Alan Howard, Schenectady, N. Y., assignor to General Electric Company, a corporation of New York Application February 17, 1938, Serial No. 191,056

8 Claims. (Cl. 60—1)

The present invention relates to elastic fluid turbine turning mechanisms, that is, to arrangements for slowly turning a turbine rotor after the turbine has been shut down in order to prevent sagging of the turbine shaft. It has been customary after shutting down the turbine manually to connect a drive motor and a gearing to the turbine shaft after the shaft speed has dropped to 1 or 2 R. P. M.

The general object of my invention is to provide an improved construction and arrangement of turbine turning mechanisms whereby such mechanism is automatically connected to the turbine shaft when the latter reaches a fixed minimum speed. A specific object of my invention is the provision of an improved switching and speed-indicating mechanism for automatically closing or opening an electric circuit and for indicating a certain speed upon the occurrence of a certain condition in the operation of a turbine or like rotary machine.

For a consideration of what I believe to be novel and my invention, attention is directed to the following specification and the claims appended thereto in connection with the accompanying drawing.

Figure 1:
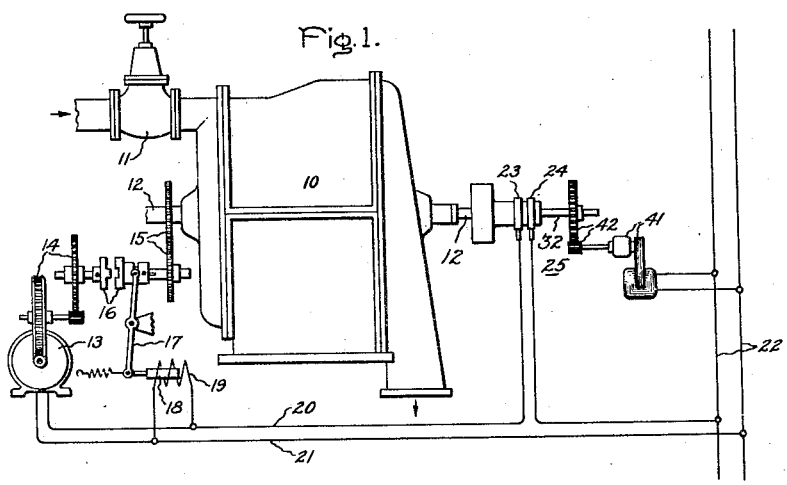
Figure 2:
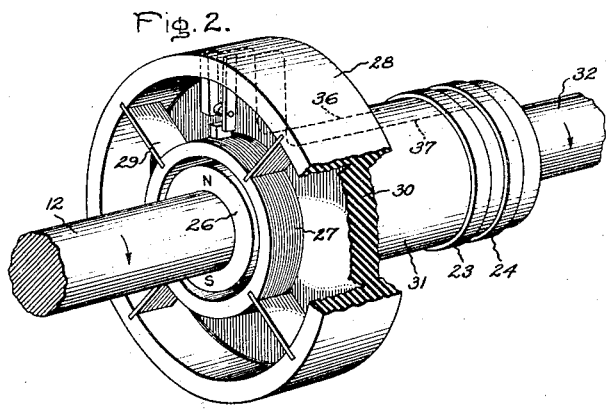
Figure 3:
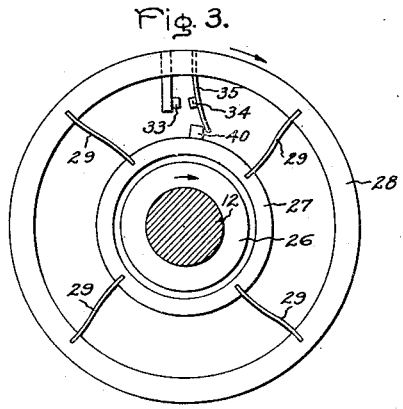

Fig. 1 illustrates a turbine with a turning mechanism embodying my invention; Fig. 2 is a perspective view of certain parts of Fig. 1; and Fig. 3 is a front view of Fig. 2 under a different operating condition.

The arrangement comprises an elastic fluid turbine 10 with an inlet valve 11 and a rotor shaft 12. When the valve 11 is shut down, thus interrupting the flow of elastic fluid to the turbine, the speed of the latter drops. If the rotor were permitted to come to a standstill and cool off from the high temperature it reaches during operation to room temperature, the rotor shaft would sag, that is, the rotor axis would not remain a straight line. To prevent this sagging, the rotor is not permitted to come to a standstill but is mechanically rotated by a motor and a gearing as soon as the rotor speed has dropped to about 1 R. P. M.

The turning mechanism in the present instance comprises an electric motor 13 connected by a reducing gearing 14, 15 and a clutch 16 to the turbine shaft 12. The clutch is engaged and disengaged by a fulcrum lever 17 which has one end connected to one of the clutch halves and another end connected to a solenoid 18. The solenoid has an energizing coil 19 which is connected parallel with the electric motor 13 by conductors 20 and 21 to a line 22. The conductor 20 includes two slip rings 23, 24 which form part of a switching mechanism 25.

The switch mechanism, as shown in Fig. 2, comprises a permanent magnet in the form of a ring 26 having north and south poles N and S and driven by the turbine shaft 12. In the present instance the ring 26 is directly secured to the turbine shaft 12. This magnetic ring 26 is concentrically surrounded by a ring 27 preferably of highly hysteretic laminated steel. The hysteretic ring 27 is flexibly supported on an outer ring 28 of insulating material by means of a plurality, in the present instance 4, radially arranged springs 29, the latter being in the form of leaves with opposite ends secured to the rings 27 and 28 respectively. The outer ring 28 has an end plate 30 with a tubular extension 31 secured to a shaft 32. The shaft 32 is supported in suitable bearings (not shown) in axial alignment with turbine shaft 12. Two contacts 33 and 34 are secured to the outer ring 28, the contact 34 being held on a flexible spring 35. The contacts 33, 34 are electrically connected by conductors 36 and 37 to the two slip rings 23, 24 secured to the aforementioned sleeve 31. The contacts when closed, as shown in Fig. 2, close the operating circuit formed through conductors 20, 21 for the solenoid 19 and the motor 13, thus effecting engagement of the clutch 16 and operation of the turning gear, turning the turbine at a fixed speed of, for instance, 1 R. P. M. Normally the contacts are held open, as shown in Fig. 3, by a contact opening member or projection 40 secured to the ring 27 and engaging the spring support 35 for the contact 34. The shaft 32 is rotated at a fixed low speed by means of an electric motor 41 energized from the line 22 and a gearing 42. The motor 41 is preferably a synchronous motor to effect operation of the switching mechanism at a fixed speed of the turbine.

The operation of the mechanism is as follows: Normally the shaft 12 is rotated at turbine speed which may be 1800 R. P. M. and the shaft 32 is continuously rotated at a speed of, for instance, 1 R. P. M. Under such condition the hysteretic ring 27, due to the magnetic drag caused by the field of the magnet ring 26, is turned angularly a few degrees relative to the supporting ring 28 against the force of the supporting springs 29. The latter thereby assume a curved shape, that is, a deflection, as indicated in Fig. 3. At the same time the contact-breaking member 40 engages the spring 35 and holds the contact 34 away from the contact 33, thus keeping the circuit for the motor 13 and the energizing coil 19 interrupted. When the turbine is shut down, its speed drops, thereby reducing the relative speed between the magnetic ring 26 and the hysteretic ring 27. The change in the relative speed between these rings does not change the relative position of the contacts 33, 34. The contacts remain open as long as any positive relative speed exists between the rings 26, 27, that is, as long as the magnetic ring 26 runs faster than the hysteretic ring 27 and in the same direction. It is important here to note that the drag effect between the rings 26, 27 is due to magnetic friction, that is, hysteresis in the ring 27 and that this friction is substantially constant, that is, not dependent upon the relative speed between the rings. Only after this relative speed has been reversed, that is, has become zero, or rather after the relative movement has been reversed, that is, the speed of the ring 26 has become slightly slower than that of the ring 27, will the drag effect be reversed and then permit closing of the contacts 33, 34. Thus, if the hysteretic ring 27 is rotated at a constant speed of 1 R. P. M. and the turbine speed slows down to the same speed of 1 R. P. M., the contacts still remain open due to the residual magnetism in the hysteretic ring 27 and the fact that the magnetic axis of the ring 27 lags behind that of the magnet ring 26. As the speed of the ring 26, that is, of the turbine rotor, drops slightly below 1 R. P. M., the two magnetic axes gradually coincide and then reverse their relative angular position, thereby causing closing of the contacts, and consequently operation of the turbine turning gearing. The rings 26 and 27 with their support form in substance a hysteresis brake or clutch or friction device. The switching mechanism shown in Fig. 2 as a whole constitutes broadly an arrangement for automatically closing or opening an electric circuit as the relative speed between two movable elements reaches a negative value. At the same time the mechanism shown in Fig. 2 constitutes a speed-indicating mechanism in that, for instance, the opening of the contacts 33, 34 indicates that the turbine has reached a speed of 1 R. P. M. The switching mechanism or circuit breaker, while useful in connection with elastic fluid turbine turning mechanisms, is not necessarily limited to such use but may be applied wherever it is desirable to open or close a circuit at a certain speed of a rotary machine or machine element in order to affect the operation of such machine or machine element or to indicate a certain operating condition, for instance, by the ringing of a bell.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination of an elastic fluid turbine including a rotor with a shaft, means for turning the rotor comprising a motor and a gearing mechanically connected to the rotor, and means for automatically starting the motor after the turbine is shut down and reaches a fixed minimum speed, said means comprising a speed-responsive device having a first element connected to the turbine rotor, a second element in cooperative relation to the first element and means for rotating the second element at constant speed.

2. The combination of an elastic fluid turbine including a rotor with a shaft, means for turning the rotor comprising a motor and a gearing mechanically connected to the rotor, an electric circuit for the motor, and means for automatically starting the motor after the turbine is shut down and reaches a fixed minimum speed, said means comprising a speed-responsive device having a first element connected to the turbine rotor, a second element in cooperative relation with the first element and including a switch forming part of the circuit and a constant speed motor for rotating the second element.

3. The combination of an elastic fluid turbine having a rotor with a shaft, means for slowly rotating the rotor when the turbine is shut down comprising an electric motor, a gearing and a clutch connecting the motor to the shaft, electric means for actuating the clutch, and an electric circuit including an automatic switch mechanism for energizing the electric means and the motor as the turbine speed reaches a fixed low value, the automatic switch mechanism comprising a magnetic ring mechanically connected to the turbine shaft, a ring of highly hysteretic material concentrically surrounding the magnetic ring, a flexible support for the hysteretic ring, a motor for rotating the support together with the hysteretic ring at a fixed low speed, contacts secured to the support and forming part of the electric circuit and a contact-breaking member secured to the hysteretic ring for keeping said contacts open as long as the relative speed between the magnetic and hysteretic rings is above a certain value.

4. Automatic switching and speed-indicating mechanism comprising a magnetic member for connection to a rotatable shaft whose speed is to be indicated, a member of highly hysteretic material spaced from the magnetic member, a rotatable element, flexible means connecting the hysteretic member to the element, a motor and gearing for rotating the element, means secured to the element forming a switch, and a switch opening member secured to the hysteretic member for opening the switch as the relative speed between the magnetic and hysteretic members reaches a certain value.

5. A speed-indicating mechanism including the combination of a hysteretic clutch having a permanent magnet member for rotation by the element whose speed is to be indicated and a member of highly hysteretic material slightly spaced from the magnetic member, a flexible support for the hysteretic member, and a constant speed motor for rotating the support.

6. A speed-indicating mechanism including the combination of a hysteretic clutch having a magnet for rotation by the element whose speed is to be indicated and a laminated ring of highly hysteretic material slightly concentrically spaced from the magnetic ring, and rotatable means supporting the hysteretic ring.

7. A speed-indicating mechanism including the combination of a hysteretic clutch having a rotatable magnet member and a member of highly hysteretic material slightly spaced from the magnetic member, a flexible support for one of the members, a constant speed motor for rotating the support, and means for rotating the other member by an element whose speed is to be indicated.

8. A speed-indicating mechanism including the combination of a hysteretic clutch having a permanent magnet ring for rotation by the element whose speed is to be indicated and a laminated ring of highly hysteretic material slightly concentrically spaced from the magnetic ring, means flexibly supporting the hysteretic ring against angular movement, said means comprising a supporting ring concentrically spaced from the hysteretic ring, a plurality of leaf springs radially disposed between the rings and having inner ends secured to the hysteretic ring and outer ends secured to the supporting ring, and means including a constant speed motor for rotating the supporting ring.

ALAN HOWARD.